(12) United States Patent
Takizawa

(10) Patent No.: US 10,979,597 B2
(45) Date of Patent: Apr. 13, 2021

(54) IMAGE PROCESSING APPARATUS, IMAGE PROCESSING METHOD, AND PROGRAM

(71) Applicant: Dai Nippon Printing Co., Ltd., Tokyo (JP)

(72) Inventor: Naoki Takizawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 112 days.

(21) Appl. No.: 16/099,844

(22) PCT Filed: May 22, 2017

(86) PCT No.: PCT/JP2017/019022
§ 371 (c)(1),
(2) Date: Nov. 8, 2018

(87) PCT Pub. No.: WO2017/204157
PCT Pub. Date: Nov. 30, 2017

(65) Prior Publication Data
US 2019/0132479 A1    May 2, 2019

(30) Foreign Application Priority Data
May 23, 2016 (JP) .............................. JP2016-102734

(51) Int. Cl.
*H04N 1/60* (2006.01)
*H04N 1/40* (2006.01)
(Continued)

(52) U.S. Cl.
CPC .......... *H04N 1/40093* (2013.01); *B41J 2/525* (2013.01); *H04N 1/387* (2013.01);
(Continued)

(58) Field of Classification Search
CPC combination set(s) only.
See application file for complete search history.

(56) References Cited

U.S. PATENT DOCUMENTS 5,187,570 A  *  2/1993  Hibi ................... H04N 1/40012
                                                              358/515
7,038,810 B1     5/2006  Yamazoe et al.
(Continued)

FOREIGN PATENT DOCUMENTS

JP    2001-024872 A1    1/2001
JP    2004-102819 A1    4/2004
(Continued)

OTHER PUBLICATIONS

English translation of International Preliminary Report on Patentability (Chapter I) (Application No. PCT/JP2017/019022) dated Dec. 6, 2018, 7 pages.
(Continued)

*Primary Examiner* — Iman K Kholdebarin
(74) *Attorney, Agent, or Firm* — Burr & Brown, PLLC

(57) ABSTRACT

An image processing apparatus is provided with a converter to convert a first color image into lightness information and color information other than the lightness information, a lightness compressor to generate compressed lightness information obtained by decimating a pixel value from the lightness information, a reconverter to combine the compressed lightness information and the color information to generate a second color image, an edge extractor to extract an edge included in the first color image, and a pixel value changer to change a pixel value at a position of the edge in the second color image while maintaining similar colors, to generate a third color image.

8 Claims, 7 Drawing Sheets

(51) Int. Cl.
*H04N 1/387* (2006.01)
*H04N 1/409* (2006.01)
*H04N 1/46* (2006.01)
*H04N 1/407* (2006.01)
*B41J 2/525* (2006.01)

(52) U.S. Cl.
CPC ............. *H04N 1/40* (2013.01); *H04N 1/4072* (2013.01); *H04N 1/4074* (2013.01); *H04N 1/4092* (2013.01); *H04N 1/46* (2013.01); *H04N 1/60* (2013.01)

(56) References Cited

U.S. PATENT DOCUMENTS

2004/0047504 A1* 3/2004 Suzuki .................... H04N 1/60
382/166
2018/0292332 A1* 10/2018 Yamakawa .......... G01N 23/044

FOREIGN PATENT DOCUMENTS

| JP | 3689754 | B2 | 8/2005 |
| JP | 2015-005923 | A1 | 1/2015 |
| JP | 2015-138318 | A1 | 7/2015 |

OTHER PUBLICATIONS

International Search Report and Written Opinion (Application No. PCT/JP2017/019022) dated Aug. 22, 2017.

* cited by examiner

|   | x | | | | |
|---|---|---|---|---|---|
|   | -2 | -1 | 0 | 1 | 2 |
| -2 | f(-2,-2) | f(-1,-2) | f(0,-2) | f(1,-2) | f(2,-2) |
| -1 | f(-2,-1) | f(-1,-1) | f(0,-1) | f(1,-1) | f(2,-1) |
| y  0 | f(-2,0) | f(-1,0) | f(0,0) | f(1,0) | f(2,0) |
| 1 | f(-2,1) | f(-1,1) | f(0,1) | f(1,1) | f(2,1) |
| 2 | f(-2,2) | f(-1,2) | f(0,2) | f(1,2) | f(2,2) |

FIG. 3

IMAGE PROCESSING APPARATUS, IMAGE PROCESSING METHOD, AND PROGRAM

FIELD OF THE INVENTION

The present disclosure relates to an image processing technique for color image processing.

DESCRIPTION OF RELATED ART

Image processing to convert a photograph into an illustration-like image is known. In such image processing for illustration, a process for coloring an edge in black is performed. Or a filtering process to emphasize the edge is performed (see, Japanese Patent Laid-Open Publication No. 2001-24872 and Japanese Patent No. 3689754).

SUMMARY OF THE INVENTION

However, when an edge is merely colored in black, it may be apparent that an image is automatically generated by CG (Computer Graphics). Moreover, in the filtering process to emphasize an edge, an edge in a subject image is emphasized, so that the subject image becomes unnatural.

The present disclosure is made under consideration of the above points to provide an image processing apparatus, an image processing method, and a program, capable of generating an illustration-like image which is more natural as if drawn by a human being.

According to an aspect of the present disclosure, there is provided an image processing apparatus comprising: a converter to convert a first color image into lightness information and color information other than the lightness information;

a lightness compressor to generate compressed lightness information obtained by decimating a pixel value from the lightness information;

a reconverter to combine the compressed lightness information and the color information to generate a second color image;

an edge extractor to extract an edge included in the first color image; and a pixel value changer to change a pixel value at a position of the edge in the second color image while maintaining similar colors, to generate a third color image.

The pixel value changer may change the pixel value at the position of the edge in the second color image, while maintaining the similar colors, to a pixel value of a darker tone when luminance in an inner area of the edge in the second color image is higher than luminance in an outer area of the edge.

The pixel value changer may change the pixel value at the position of the edge in the second color image to a value obtained by multiplying the pixel value by a predetermined coefficient.

The edge extractor may further comprise:

a monochrome converter to convert the first color image into a monochrome image;

a blur processor to generate a blurred image obtained by blurring the monochrome image;

a ratio detector to detect a ratio of a pixel value of the blurred image and a pixel value of the monochrome image, the pixel value of the monochrome image corresponding to the pixel value of the blurred image;

a ratio determiner to determine whether the ratio is larger than a predetermined threshold value; and an edge output unit to output a pixel having the ratio determined as being larger than the predetermined threshold value, as an edge in the monochrome image.

The blur processor may generate the blurred image by a filtering process to the monochrome image using a Gaussian filter having a filter size in accordance with an outer size of the monochrome image.

The blur processor may generate the blurred image by a filtering process to the monochrome image using a Gaussian filter having a filter size in accordance with an outer size of the third color image. The outer size of the third color image may be an output size of a printer to print the third color image on a print paper.

According to an aspect of the present disclosure, there is provided an image processing apparatus comprising:

a blur processor to generate a blurred image obtained by blurring a monochrome image;

a ratio detector to detect a ratio of a pixel value of the blurred image and a pixel value of the monochrome image, the pixel value of the monochrome image corresponding to the pixel value of the blurred image;

a ratio determiner to determine whether the ratio is larger than a predetermined threshold value; and an edge output unit to output a pixel having the ratio determined as being larger than the predetermined threshold value, as an edge in the monochrome image.

According to an aspect of the present disclosure, there is provided an image processing method comprising:

converting a first color image into lightness information and color information other than the lightness information;

generating compressed lightness information obtained by decimating a pixel value from the lightness information;

combining the compressed lightness information and the color information to generate a second color image;

extracting an edge included in the first color image; and changing a pixel value at a position of the edge in the second color image while maintaining similar colors, to generate a third color image.

According to an aspect of the present disclosure, there is provided an image processing method comprising:

generating a blurred image obtained by blurring a monochrome image;

detecting a ratio of a pixel value of the blurred image and a pixel value of the monochrome image, the pixel value of the monochrome image corresponding to the pixel value of the blurred image;

determining whether the ratio is larger than a predetermined threshold value; and outputting a pixel having the ratio determined as being larger than the predetermined threshold value, as an edge in the monochrome image.

According to an aspect of the present disclosure, there is provided a computer readable program to be executed by a computer, comprising:

converting a first color image into lightness information and color information other than the lightness information;

generating compressed lightness information obtained by decimating a pixel value from the lightness information;

combining the compressed lightness information and the color information to generate a second color image;

extracting an edge included in the first color image; and changing a pixel value at a position of the edge in the second color image while maintaining similar colors, to generate a third color image.

According to an aspect of the present disclosure, there is provided a computer readable program to be executed by a computer, comprising:

generating a blurred image obtained by blurring a monochrome image;

detecting a ratio of a pixel value of the blurred image and a pixel value of the monochrome image, the pixel value of the monochrome image being corresponding to the pixel value of the blurred image;

determining whether the ratio is larger than a predetermined threshold value; and extracting a pixel having the ratio determined as being larger than the predetermined threshold value, as an edge in the monochrome image.

According to the present disclosure, an illustration-like image which is more natural as if drawn by a human being can be generated.

BRIEF DESCRIPTION OF THE DRAWINGS

FIG. 3 is a diagram showing coefficients in a filter size of [5×5];

DETAILED DESCRIPTION OF THE INVENTION

Hereinbelow, embodiments in the present disclosure will be explained with reference to the drawings.

First Embodiment

An image processing apparatus according to a first embodiment is to obtain an illustration-like image which seems to be more natural by changing a pixel value at the position of an edge of a color image to a pixel value of a darker tone while maintaining similar colors, based on the position of an extracted edge. The image processing apparatus will be explained hereinbelow in more detail.

Figure 1:
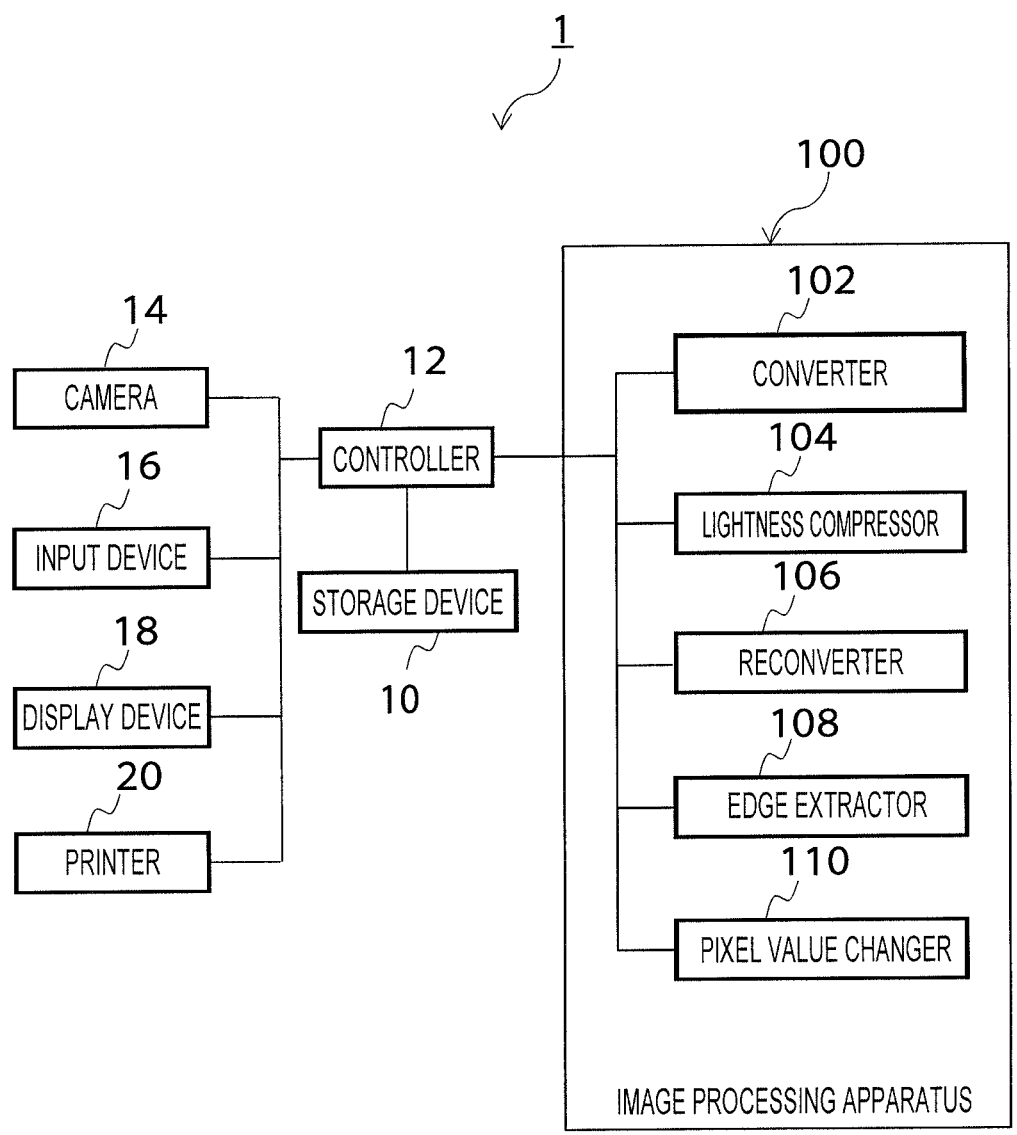
FIG. 1 is a diagram showing a configuration of an image processing system according to a first embodiment.

FIG. 1 is a diagram showing a configuration of an image processing system 1 according to the first embodiment. The image processing system 1 of FIG. 1 can, for example, be built in various types of electronic equipment (such as a personal computer) having a built-in CPU (Central Processing Unit). More specifically, the CPU executes a dedicated program to perform an operation of the image processing system 1 of FIG. 1. Or dedicated hardware equipment to perform the operation of the image processing system 1 of FIG. 1 may be provided.

The image processing system 1 of FIG. 1 is provided with a storage device 10, a controller 12, a camera 14, an input device 16, a display device 18, a printer 20, and an image processing apparatus 100. The storage device 10 stores, in addition to a system program, various types of processing programs such as a face-image photographing processing program and an image processing program, and data or the like processed by each program. The controller 12 has a CPU, a RAM (Random Access Memory), etc., to read out various types of programs such as the system program and the image processing program stored in the storage device 10 and to develop the programs in the RAM for centralized control on the operation of each component in accordance with the programs.

The camera 14 has an optical lens, an optical sensor such as a CCD (Charge Coupled Device), an A/D (Analog/Digital) converter, etc., to convert a subject image, which is input through the optical lens in photographing, by photoelectric conversion by the optical sensor, to generate an analog image signal. The A/D converter converts the analog image signal into a digital first color image and supplies the first color image to the controller 12. One pixel of the first color image, which is a natural image, is expressed by a gradation signal of three primary colors of R (red), G (green) and B (blue), for example. In more detail, RGB elements of one pixel are each expressed by an 8-bit gradation signal. Therefore, one pixel of the first color image is composed of 24 bits (8 bits×3 colors). The number of bits of one pixel is not limited to the above-described value. The color components that constitute one pixel are not limited to the RGB three colors. For example, yellow or white color pixels, or color pixels of RGB complementary colors may be provided.

The input device 16 has a touch panel integrally built in a panel of the display device 18, various types of function keys, such as, a photograph-type selection switch (hereinafter, SW) for selecting a photograph type, a photographing SW for instructing the start of photographing, a print SW for instructing the production of photographed-image print output, and so on. The input device 16 outputs an operation signal corresponding to an operated key to the controller 12.

The display device 18 has, for example, an LCD (Liquid Crystal Display) to display a guidance screen for explaining a photographing procedure, various types of operation screens such as a selection screen for selecting a photograph type, a subject image photographed by the camera 14, an illustration-like image processed by the image processing apparatus 100, and so on, in accordance with a control signal from the controller 12.

The printer 20 produces print output based on an image input from the controller 12. A printing method applicable to the printer 20 is, for example, a sublimation transfer method to sublimate and transfer a coloring material to form an image. Another applicable printing method is a thermal fusion transfer recording method to superpose a recording medium and an image receiving material on each other and heat them to transfer a recording layer of the recording medium onto an image receiving layer of the image receiving material to form an image. Electrophotography, an ink jet method, and other printing methods are also applicable. Moreover, a silver halide photo image may be formed.

The image processing apparatus 100 performs image processing to process an input first color image into an illustration-like image. The image processing apparatus 100 is provided with a converter 102, a lightness compressor 104, a reconverter 106, an edge extractor 108, and a pixel value changer 110.

The converter 102 converts the first color image input from the controller 12 into lightness information and color information other than the lightness information. The lightness information is a value indicating a scale of color image brightness. For example, the converter 102 converts an RGB first color image into YCbCr image data. Luminance (lightness) Y which expresses the lightness information can be calculated using, for example, a conversion formula Y=0.29900×R+0.58700×G+0.11400×B. In this way, lightness information per pixel is generated using the first color image.

Moreover, the converter 102 converts the RGB first color image into color information Cb, other than the lightness information, using, for example, a conversion formula Cb=−0.16874×R−0.33126×G+0.50000×B. Likewise, the converter 102 converts the RGB first color image into color information Cr, other than the lightness information, using, for example, a conversion formula Cr=0.50000×R−0.41869×G−0.0081×B. The color information Cb, which is also referred to as color difference information, indicates hue and colorfulness in a blue color system. The color information Cr, which is also referred to as color difference information, indicates hue and colorfulness in a red color system. Accordingly, using the first color image, the color information Cb and Cr per pixel are generated.

The converter 102 may generate the lightness information and the color information, using a method other than the method for converting the RGB first color image into YCbCr. For example, the first color image may be converted into a Lab or HLS color system.

The lightness compressor 104 generates compressed lightness information by decimating the lightness information obtained by the converter 102. Even if the first color image originally has information of linear brightness, the first color image is converted to have brightness of five stages.

More specifically, for example, when lightness information per pixel obtained by the converter 102 is in a range of (0 to 100), the lightness information is converted into compressed lightness information (100) after decimation of pixel values having lightness information in a range of (100 to 95). Likewise, the lightness information is converted into compressed lightness information (80) after decimation of pixel values having lightness information in a range of (95 to 55). Likewise, the lightness information is converted into compressed lightness information (60) after decimation of pixel values having lightness information in a range of (55 to 30), into compressed lightness information (25) after decimation of pixel values having lightness information in a range of (33 to 10), and into compressed lightness information (0) after decimation of pixel values having lightness information in a range of (10 to 0). By performing a decimation process described above, conversion is performed to have a lightness-compressed image having a clear difference in brightness entirely. Compressed lightness information Y' in the above is equivalent to a pixel value per pixel in a lightness-compressed image obtained by decimating luminance of a luminance image.

The reconverter 106 combines the compressed lightness information obtained by the lightness compressor 104 and the color information other than the lightness information obtained by the converter 102 to generate a second color image. More specifically, the reconverter 106 uses the compressed lightness information Y' obtained by the lightness compressor 104 and the color information Cb and Cr obtained by the converter 102 to generate the second color image. The second color image having the lightness information decimated in this way is converted into an image having illustration-like lightness with a clear difference in brightness entirely.

The edge extractor 108 extracts an edge included in the first color image. A configuration of the edge extractor 108 will be described later in detail.

The pixel value changer 110 changes a pixel value at the position of an edge in the second color image while maintaining similar colors to generate a third color image (an illustration-like image). More specifically, in the second color image, when the lightness in an inner area of the edge in the second image is higher than the lightness in an outer area of the edge, the pixel value changer 110 changes the pixel value at the position of the edge in the second color image, while maintaining similar colors, to a pixel value of a darker tone.

For example, the pixel value changer 110 changes the pixel value at the position of the edge in the second color image to a value obtained by multiplying the pixel value by a predetermined coefficient. More specifically, the pixel value changer 110 converts the pixel value at the position of the edge obtained by the edge extractor 108 by ½ or ¼ times to deepen the edge color. In this case, RGB gradation values per pixel are changed to values obtained by multiplying the RGB gradation values per pixel by a predetermined coefficient (for example, ½ or ¼).

In the manner described above, having the edge's original tone being maintained, the original tone is more deepened. For example, when the original color is pink, an edge with deepened pink is generated. For example, when the original color is green, an edge with deepened green is generated. In this way, by generating an edge while maintaining the original color, an image viewed as if painted with paint can be obtained. In other words, an illustration-like image, which is hardly recognized as a CG-generated image, can be obtained. When the pixel value changer 110 deepens the edge color, the coefficient value to be multiplied to the RGB gradation values per pixel may be changed for each of the RGB components.

Figure 2:
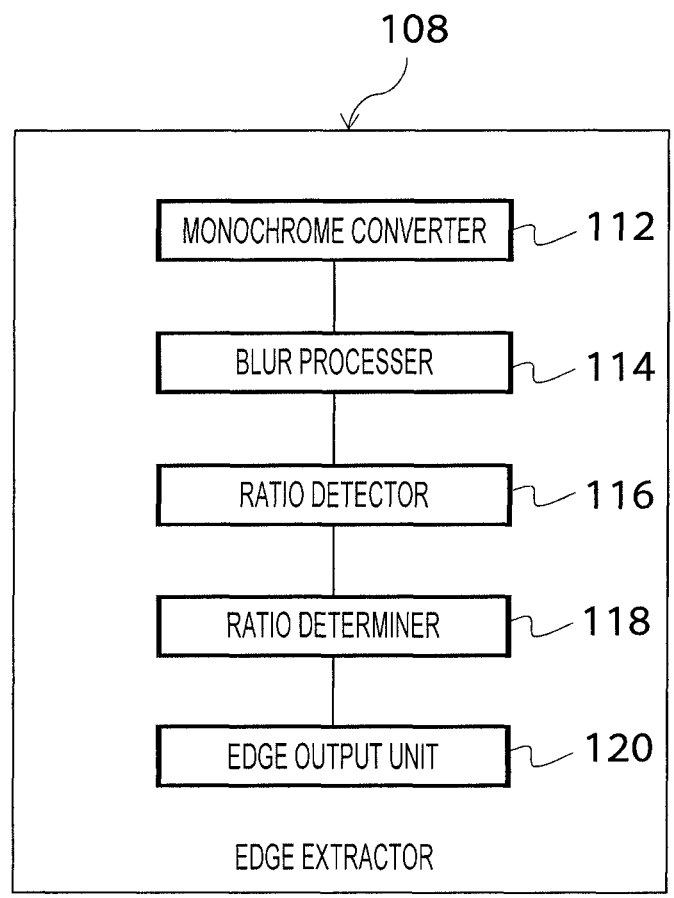
FIG. 2 is a block diagram showing a configuration of an edge extractor.

Subsequently, a configuration of the edge extractor 108 will be explained in detail based on FIG. 2. FIG. 2 is a block diagram showing the configuration of the edge extractor 108. As shown in FIG. 2, the edge extractor 108 is provided with a monochrome converter 112, a blur processer 114, a ratio detector 116, a ratio determiner 118, and an edge output unit 120.

The monochrome converter 112 converts the first color image into a monochrome image. The monochrome converter 112 converts the RGB first color image into luminance (lightness)-Y information in accordance with the above-described conversion formula. The monochrome image is equivalent to the luminance information.

The blur processer 114 generates a blurred image by blurring the monochrome image. More specifically, for example, the blur processer 114 applies a filtering process to the monochrome image to generate a blurred image, using a Gaussian filter having a filter size in accordance with the outer size of the monochrome image.

The ratio detector 116 detects a ratio of a pixel value of the blurred image obtained by the blur processer 114 and a pixel value of the monochrome image, which corresponds to the pixel value of the blurred image. More specifically, the ratio detector 116 calculates the ratio using an expression Ratio=Blurred-image pixel value/Monochrome-image pixel value. The ratio determiner 118 determiners whether the calculated ratio is larger than a predetermined threshold value.

The edge output unit 120 outputs a pixel, for which the ratio detected by the ratio detector 116 is determined as being larger than the predetermined threshold value, as an edge in the monochrome image. For example, when outputting, as an edge, an area having a ratio of 0.9 or higher, an edge, for which the luminance of an inner area of the edge is higher than the luminance of an outer area of the edge, can be detected. Accordingly, for example, for an image of a human being, an edge can be set at an outer portion along the contour of a human face. There is no possibility of extracting an edge that cuts into the face. Therefore, there is no problem in that impression of the human face changes due to unnatural edge extraction.

As the Gaussian filter used by the blur processer 114 has a larger filter size, the edge output unit 120 can output a smaller (weaker) edge. On the other hand, as the Gaussian filter has a smaller filter size, the edge output unit 120 cannot extract a smaller edge. A small (weak) edge is a contour line with a relatively moderate change in luminance. A large (strong) edge is a contour line with a drastic change in luminance.

An image with a small area becomes complicated when even a small edge is extracted, and hence it is desirable to extract a large edge only. On the other hand, for an image with a large area, image reproducibility becomes excellent by extracting even a small edge. For this reason, in the present embodiment, the filter size is changed according to a short side size of image data. In detail, as the image data has a longer short side, the Gaussian filter of the blur processer 114 is changed to have a larger filter size.

As described above, by changing the filter size of the Gaussian filter used in the blur processer 114, the size of an edge to be extracted is changed. Moreover, by changing the filter size of the Gaussian filter, the width of an edge output by the edge output unit 120 is changed. Specifically, as the filter size becomes larger, the edge output by the edge output unit 120 has a larger width.

As described above, in the monochrome image, a portion with a drastic change in luminance becomes a large (strong) edge whereas a portion with a moderate change in luminance becomes a small (weak) edge. Therefore, when the strong and weak edges are compared to each other, for the strong edge, a differential value between the corresponding pixel values of the blurred image obtained by the blur processer 114 and of the monochrome image becomes large. As the differential value becomes larger, the edge output unit 120 outputs an edge with a larger width. Accordingly, the strong edge has a larger width than the weak edge. In this way, the strong edge with a drastic change in luminance has a thick line whereas the weak edge with a moderate change in luminance has a narrow line, with the edge width continuously changing in accordance with the luminance difference. As described above, in the present embodiment, since the contour line thickness is changeable in accordance with the edge strength, an image shown as if painted with paint can be obtained.

Subsequently, coefficients of the Gaussian filter in the blur processer 114 will be explained based on FIG. 3. FIG. 3 is a diagram showing coefficients in a filter size of [5×5]. As shown in FIG. 3, a coefficient f (x, y) is calculated in accordance with the Gaussian distribution function expressed by the following expression (1).

$$f(x, y) = \frac{1}{2\pi\sigma^2} \exp\left(-\frac{x^2 + y^2}{2\sigma^2}\right)$$ Expression (1)

Here, (x, y) indicates a distance from a target pixel. In practice, coefficients are normalized so that the sum of all coefficients becomes 1. More specifically, the coefficients are normalized in accordance with an expression (2).

$$f'(x, y) = \frac{f(x, y)}{\sum_{k,l} f(k, l)}$$ Expression (2)

A filter size [N×N] is calculated using the value of a vertical or transversal short side of an input image. More specifically, the filter size [N×N] is calculated using an expression Filter one-side length=Short side length/Defined value. The short side length is the length of a shorter side between a vertical side of and a transversal side of the input image. Therefore, the filter size [N×N] is calculated with N=Filter one-side length/Pixel size.

Figure 4:
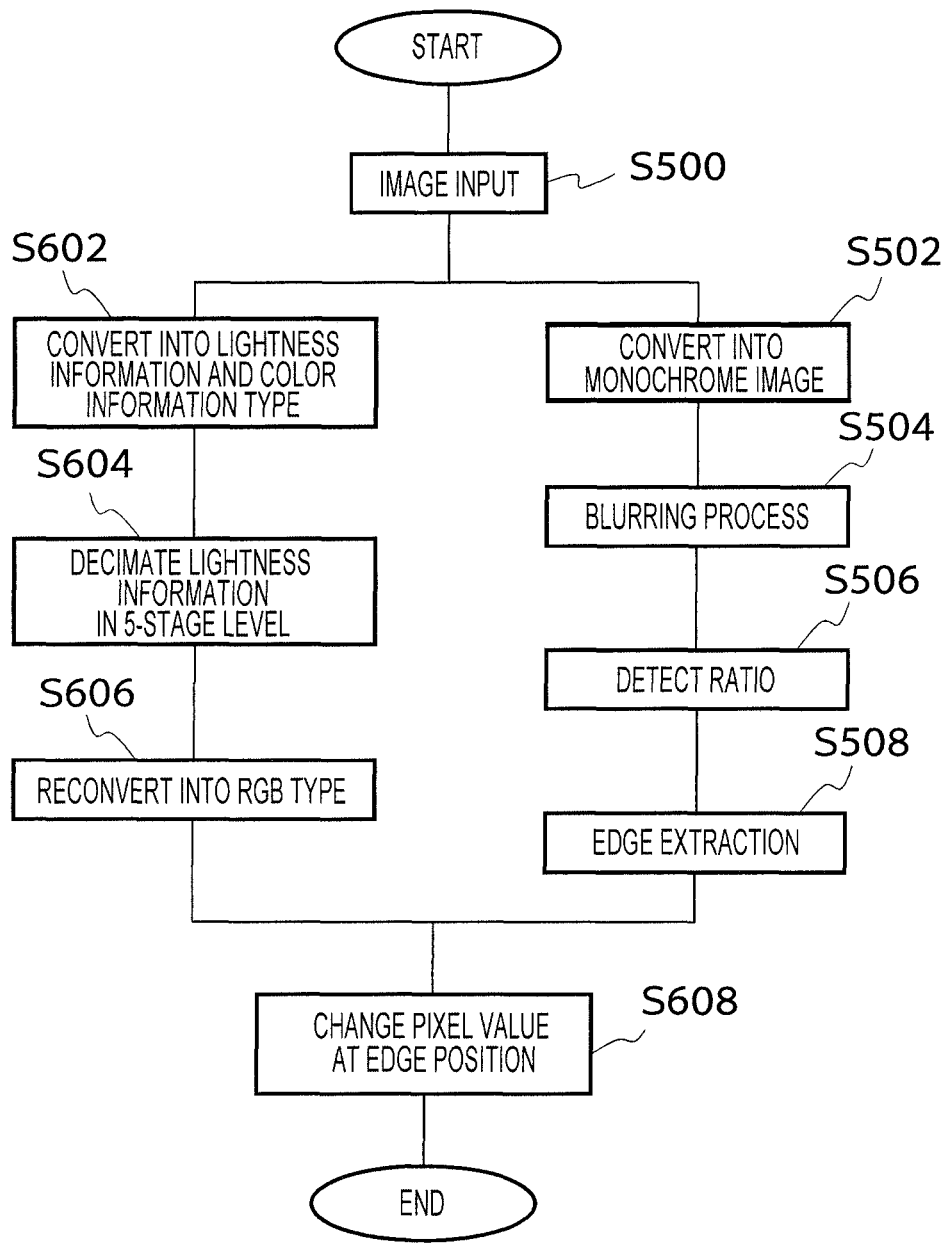
FIG. 4 is a diagram showing a flowchart of an illustration process in an image processing apparatus.
Figure 5A:
FIG. 5 is a view showing images related to an edge extraction process.
Figure 5B:
Figure 5C:
Figure 5D:

Subsequently, a flow of an illustration process will be explained based on FIGS. 4 to 6. FIG. 4 is a diagram showing a flowchart of the illustration process in the image processing apparatus 100. With reference to FIG. 4, an example of an edge extraction process and a lightness decimation process performed in parallel, will be explained. Either of the processes may, however, be performed before the other of the processes.

FIG. 5 is a view showing images related to the edge extraction process. FIG. 5(*a*) is a first color image of a rose photographed by the camera 14. FIG. 5(*b*) is a monochrome image converted by the monochrome converter 112. FIG. 5(*c*) is a blurred image obtained by the blur processer 114. FIG. 5(*d*) is an image with an edge, obtained by the edge output unit 120, shown in black.

FIG. 6 is a view showing images related to the decimation process. FIG. 6(*a*) is the first color image of the rose photographed by the camera 14. FIG. 6(*b*) is an image (luminance image) indicating lightness information converted by the converter 102. FIG. 6(*c*) is an image (compressed lightness image) indicating compressed lightness information obtained by the lightness compressor 104. FIG. 6(*d*) is a second color image obtained by the reconverter 106. FIG. 6(*e*) is a third color image obtained by the pixel value changer 110.

First of all, a flow of the edge extraction process will be explained. As shown in FIG. 4, the first color image (FIGS. 5(*a*) and 6(*a*)) of the rose photographed by the camera 14 is input to the monochrome converter 112 and the converter 102 via the controller 12 (step S500).

Subsequently, the monochrome converter 112 converts the first color image to the monochrome image (FIG. 5(*b*)) in accordance with the above-described conversion formula (step S502). In this way, the first color image is converted into a monochrome image having lightness Y from 0 to 100.

Subsequently, the blur processer 114 calculates a filter size based on a short side length of the monochrome image to calculate coefficients of the Gaussian distribution function, and then performs a filtering process to all pixels of the monochrome image, to generate a blurred image (FIG. 5(*c*)) (step S504).

Subsequently, the ratio detector 116 detects a ratio of a pixel value of the blurred image and a pixel value of the monochrome image, which corresponds to the pixel value of the blurred image (step S506). Then, the edge output unit 120 outputs a pixel for which the ratio is determined as larger than a predetermined threshold value, as an edge in the monochrome image (step S508). Here, a pixel for which the ratio is equal to or higher than 0.7 but lower than 1.0 is output as the edge. In this case, pixels corresponding to the edge, defined as having a pixel value of 0 (corresponding to black in FIG. 5(*d*)), and the other pixels defined as having a pixel value of 100 (corresponding to white in FIG. 5(*d*)) are output.

Subsequently, a flow of the decimation process will be explained. As shown in FIG. 4, the converter 102 converts the first color image (FIG. 6(a)) input from the controller 12 into lightness information (FIG. 6(b)) Y and color information other than the lightness information (step S602).

Subsequently, the lightness compressor 104 generates compressed lightness information Y' obtained by decimating the lightness information Y (step S604). Here, lightness information Y (FIG. 6(b)) having a value in the range of 0 to 100 is decimated to generate compressed lightness information Y' having a value of any of 100, 80, 60, 25, and 0 (FIG. 6(c)).

Figure 6A:
FIG. 6 is a view showing images related to a decimation process.
Figure 6B:
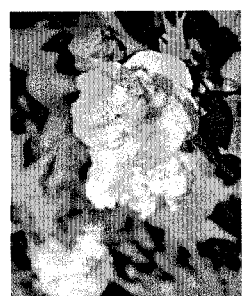
Figure 6C:
Figure 6D:

Subsequently, the reconverter 106 combines the compressed lightness information Y' obtained by the lightness compressor 104 and the color information Cb and Cr obtained by the converter 102 to generate a second color image (FIG. 6(d)) (step S606), the information being reconverted into a second color image having RGB gradation values for each one pixel.

Figure 6E:

Subsequently, the pixel value changer 110 changes a pixel value at the position of an edge in the second color image while maintaining similar colors to generate a third color image (FIG. 6(e)) (step S608). Here, a value of each of RGB components corresponding to the position of the edge output by the edge output unit 120 is multiplied by ½. In other words, a value of each of RGB gradation values of the second color image corresponding to the position (a pixel indicating a pixel value of 100) of the edge output by the edge output unit 120 is multiplied by ½. Subsequently, the pixel value changer 110 outputs the third color image to the display device 18 and the printer 20 via the controller 12, and the entire process ends.

As described above, in the edge extraction process, by detecting the ratio of a pixel value of a blurred image and a pixel value of a monochrome image, which corresponds to the pixel value of the blurred image, it is possible to output a strong edge having a larger width. Moreover, in the lightness decimation process, by generating compressed lightness information having lightness information decimated after the conversion of a first color image into the lightness information, and by reconverting the compressed lightness information into a second color image, it is possible to obtain a second color image with a clear difference in brightness entirely. Moreover, by making thick the edge color of the second color image, it is possible to obtain a third color image (illustration-like image) which is shown as if painted with paint. In this case, for a stronger edge, by making the edge thicker, it is possible to obtain an illustration-like image which seems to be more natural.

As described above, according to the first embodiment, since a pixel value at the position of an extracted edge is changed while maintaining similar colors, an illustration-like image, which seems to be more natural as if painted with paint, can be generated. Moreover, since the edge width is variable depending on whether the edge is strong or weak, the edge width can be optimized in accordance with the surrounding images, and hence an image with no strange impression can be obtained.

Second Embodiment

In the above-described first embodiment, the blur processer 114 sets the filter size in accordance with the outer size of a monochrome image. Another condition may be considered for setting the filter size. A different condition for setting the filter size is, for example, the outer size of the third color image that is an output result of the printer 20.

Hereinbelow, the portion different from the first embodiment will be explained. The configuration of the image processing system 1 is the same as that shown in FIGS. 1 to 3, hence the explanation thereof being omitted.

Figure 7:
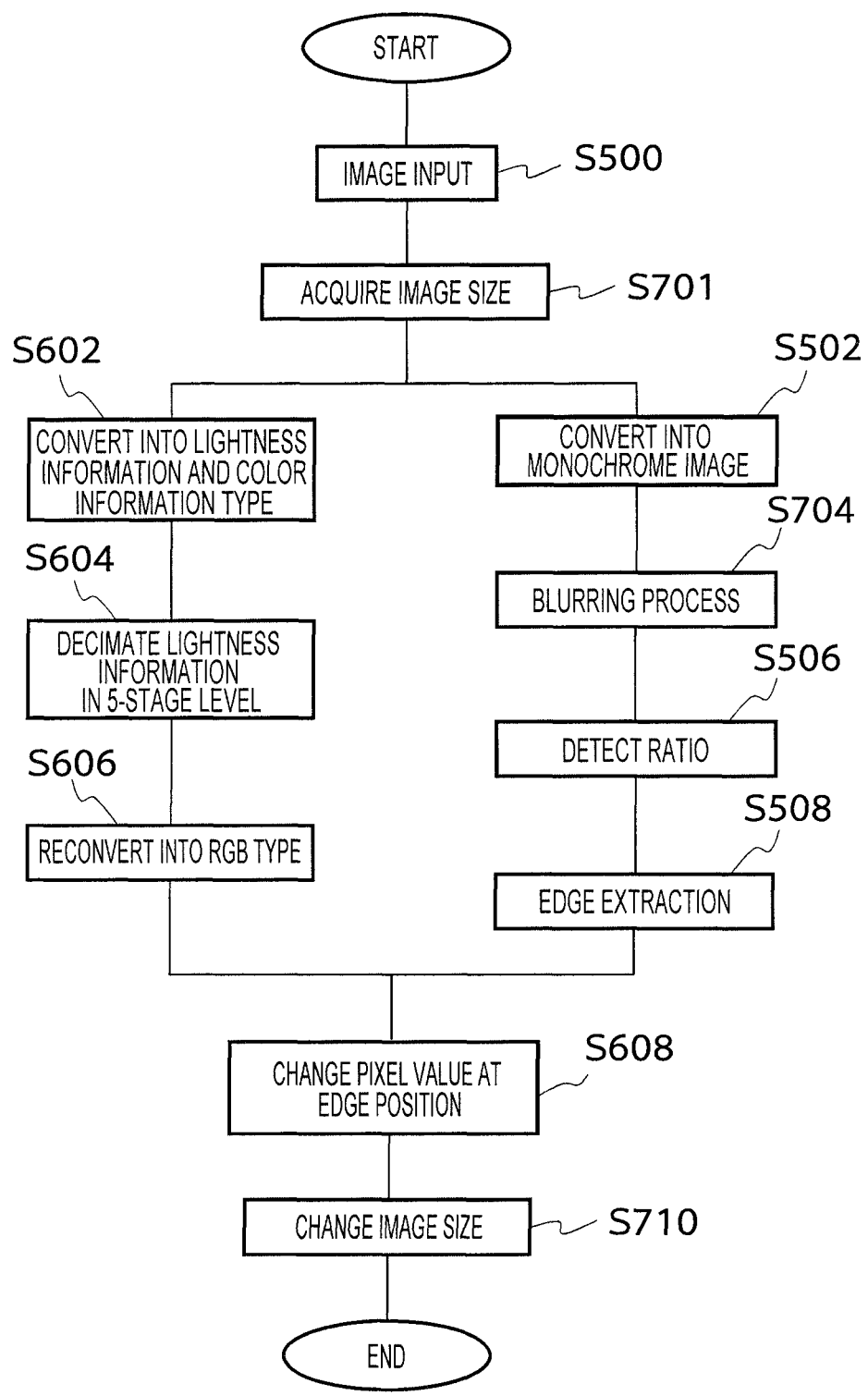
FIG. 7 is a diagram showing a flowchart of an illustration process in a second embodiment.

FIG. 7 is a diagram showing a flowchart of an illustration process in a second embodiment. The image processing apparatus according to the second embodiment has the same configuration as that of FIG. 1, except for the illustration process different from the first embodiment. In FIG. 7, the same process as that of FIG. 4 is given the same step number. Hereinbelow, the different points will mainly be explained. As shown in FIG. 7, when starting the illustration process, the controller 12 acquires an image output size set in the printer 20 and outputs the image output size to the blur processer 114 (step S701).

The blur processer 114 blurs a monochrome image to generate a blurred image based on the Gaussian filter having a filter size set in accordance with a short side length of the image output size set in the printer 20 (step S704). As described above, the blur processer 114 sets the filter size of the Gaussian filter in accordance with the outer size of the above-described third color image.

Subsequently, the pixel value changer 110 further changes the size of the third color image generated by the pixel value changer 110 to the outer size of the third color image, that is, the output size of the printer 20, and outputs the changed size to the display device 18 and the printer 20 via the controller 12 (step S710), and the entire process ends.

As described above, in the second embodiment, since the filter size is set in accordance with the outer size of the third color image, that is, the output size of the printer 20, an edge having a size and width fit to the outer size of the third color image can be generated. Accordingly, even when the outer size of the third color image changes variously, an illustration-like image shown as if actually drawn by a human being can be generated.

As described above, according to the second embodiment, since the filter size is set in accordance with the outer size of the third color image generated by the pixel value changer 110, that is, the output size of the printer 20, edge extraction optimum to the outer size of the third color image can be performed.

In the above-described first and second embodiments, the Gaussian filter is used for the blurring process. However, the filter to be used for the blurring process may not necessary be the Gaussian filter, for example, the Laplacian filter may be used. However, in the first and second embodiments, not directly extracting an edge with the filter, but the filter is used for the blurring process. Therefore, there is no limitation on the actual filter type, as far as a filter to be used is capable of the blurring process and is filter-size changeable.

At least part of the image processing apparatus 100 explained in the above-described embodiments may be configured with hardware or software. When it is configured with software, a program that performs at least part of the image processing apparatus 100 may be stored in a storage medium such as a flexible disk and CD-ROM, and then installed in a computer to run thereon. The storage medium may not be limited to a detachable one such as a magnetic disk and an optical disk but may be a standalone type such as a hard disk and a memory.

Moreover, a program that achieves the function of at least part of the image processing apparatus 100 may be distributed via a communication network a (including wireless communication) such as the Internet. The program may also be distributed via an online network such as the Internet or a wireless network, or stored in a storage medium and distributed under the condition that the program is encrypted, modulated or compressed.

The present disclosure is not limited to the embodiments described above but includes various modifications conceivable by those skilled in the art. The effects of the present disclosure are also not limited to those described above. Namely, various additions, modifications and partial omissions may be made without departing from the conceptual idea and gist of present disclosure derived from those defined in the accompanying claims and their equivalents.

The invention claimed is:

1. An image processing apparatus comprising:
a converter to convert a first color image into lightness information and color information other than the lightness information;
a lightness compressor to generate compressed lightness information obtained by decimating a pixel value from the lightness information;
a reconverter to combine the compressed lightness information and the color information to generate a second color image;
an edge extractor to extract an edge included in the first color image; and
a pixel value changer to change a pixel value at a position of the edge in the second color image while maintaining similar colors, to generate a third color image,
wherein the pixel value changer changes the pixel value at the position of the edge in the second color image, while maintaining the similar colors, to a pixel value of a darker tone when luminance in an inner area of the edge in the second color image is higher than luminance in an outer area of the edge.

2. The image processing apparatus of claim 1, wherein the pixel value changer changes the pixel value at the position of the edge in the second color image to a value obtained by multiplying the pixel value by a predetermined coefficient.

3. An image processing apparatus comprising:
a converter to convert a first color image into lightness information and color information other than the lightness information;
a lightness compressor to generate compressed lightness information obtained by decimating a pixel value from the lightness information;
a reconverter to combine the compressed lightness information and the color information to generate a second color image;
an edge extractor to extract an edge included in the first color image; and
a pixel value changer to change a pixel value at a position of the edge in the second color image while maintaining similar colors, to generate a third color image;
wherein the edge extractor further comprises
a monochrome converter to convert the first color image into a monochrome image,
a blur processor to generate a blurred image obtained by blurring the monochrome image,
a ratio detector to detect a ratio of a pixel value of the blurred image and a pixel value of the monochrome image, the pixel value of the monochrome image corresponding to the pixel value of the blurred image,
a ratio determiner to determine whether the ratio is larger than a predetermined threshold value, and
an edge output unit to output a pixel having the ratio determined as being larger than the predetermined threshold value, as an edge in the monochrome image.

4. The image processing apparatus of claim 3, wherein the blur processor generates the blurred image by a filtering process to the monochrome image using a Gaussian filter having a filter size in accordance with an outer size of the monochrome image.

5. The image processing apparatus of claim 3, wherein the blur processor generates the blurred image by a filtering process to the monochrome image using a Gaussian filter having a filter size in accordance with an outer size of the third color image.

6. The image processing apparatus of claim 5, wherein the outer size of the third color image is an output size of a printer to print the third color image on a print paper.

7. An image processing method comprising:
converting a first color image into lightness information and color information other than the lightness information;
generating compressed lightness information obtained by decimating a pixel value from the lightness information;
combining the compressed lightness information and the color information to generate a second color image;
extracting an edge included in the first color image; and
changing a pixel value at a position of the edge in the second color image while maintaining similar colors, to generate a third color image,
wherein the pixel value at the position of the edge in the second color image is changed, while maintaining the similar colors, to a pixel value of a darker tone when luminance in an inner area of the edge in the second color image is higher than luminance in an outer area of the edge.

8. A non-transitory computer readable recording medium that stores a program, the program that causes a computer to execute:
converting a first color image into lightness information and color information other than the lightness information;
generating compressed lightness information obtained by decimating a pixel value from the lightness information;
combining the compressed lightness information and the color information to generate a second color image;
extracting an edge included in the first color image; and
changing a pixel value at a position of the edge in the second color image while maintaining similar colors, to generate a third color image,
wherein the pixel value at the position of the edge in the second color image is changed, while maintaining the similar colors, to a pixel value of a darker tone when luminance in an inner area of the edge in the second color image is higher than luminance in an outer area of the edge.

* * * * *